United States Patent
Timmons et al.

(10) Patent No.: US 6,447,954 B1
(45) Date of Patent: Sep. 10, 2002

(54) HIGH ENERGY, LIGHT WEIGHT, LEAD-ACID STORAGE BATTERY

(75) Inventors: John B. Timmons, Winston-Salem, NC (US); Joseph A. Orsino, San Clemente; Ramesh Bhardwaj, Walnut, both of CA (US)

(73) Assignee: Concorde Battery Corporation, West Covina, CA (US)

( * ) Notice: Subject to any disclaimer, the term of this patent is extended or adjusted under 35 U.S.C. 154(b) by 49 days.

(21) Appl. No.: 09/602,346

(22) Filed: Jun. 23, 2000

(51) Int. Cl.$^7$ .......................... H01M 4/56; B23P 13/00; C25D 3/00
(52) U.S. Cl. .................. 429/225; 429/226; 429/232; 429/233; 429/234; 29/2; 204/243.1; 204/194; 205/50; 205/80; 205/149; 205/234
(58) Field of Search ................... 429/225, 226, 429/232, 233; 29/2; 204/243.1, 194; 205/50, 80, 149, 234

(56) References Cited

U.S. PATENT DOCUMENTS

| | | | |
|---|---|---|---|
| 4,482,618 A | 11/1984 | Orsino et al. ............... 429/179 |
| 4,554,228 A | 11/1985 | Kiessling ................... 429/242 |
| 4,760,001 A | 7/1988 | Nann et al. ................. 429/136 |
| RE33,133 E | 12/1989 | Kiessling ................... 429/242 |
| 5,332,634 A | * 7/1994 | Stoilov et al. .............. 429/211 |
| 5,521,029 A | * 5/1996 | Fiorino et al. .............. 205/150 |

FOREIGN PATENT DOCUMENTS

JP    363174276 A  *  7/1988  ............ H01M/4/68

OTHER PUBLICATIONS

Yolshina, et al., "A lead–film electrode on an aluminum substrate to serve as a lead–acid battery plate," 1999, J. Power Sources, 78: 84–87.*

A lead–film electrode on an aluminium substrate to serve as a lead–acid battery plate, L.A. Yolshina et al., *Journal of Power Sources* 78, pp. 84–87, 1999.

"Conducting Polymer Blends as Inert Electrodes", AMP Journal of Technology, vol. 1, Nov. 1991, J.L. Joyce, Jr. et al.

"A New Anisotropic Conductive Film with Arrayed Conductive Particles", AMP Journal of Technology, vol. 5, Jun., 1996; K. Ishibashi and J. Kimura.

* cited by examiner

*Primary Examiner*—Patrick Ryan
*Assistant Examiner*—Angela J Martin
(74) *Attorney, Agent, or Firm*—Womble Carlyle Sandridge & Rice, PLLC

(57) ABSTRACT

Light weight, low resistance electrode plates for lead-acid batteries are formed from a highly conductive non-lead substrate such as aluminum or copper, coated with a continuous layer of a corrosive resistant conductive materials, such as lead, applied from a fused salt bath.

11 Claims, 2 Drawing Sheets

HIGH ENERGY, LIGHT WEIGHT, LEAD-ACID STORAGE BATTERY

FIELD OF THE INVENTION

The present invention is directed to lead-acid batteries, and particularly to lightweight, high energy batteries formed with electrodes having a non-lead conductive substrate covered by a continuous, non-corrosive, conductive coating.

BACKGROUND OF THE INVENTION

Lead-acid batteries conventionally include a multiplicity of cells connected together in series. Each cell consists of a stack of alternating electrodes, namely cathodes and anodes. Often there is a layer of insulation between the electrodes. The cells are flooded or provided in some manner with an electrolyte (generally sulfuric acid).

In the past, the electrodes have been formed primarily of lead castings, stampings, or expended mesh of lead or of a lead alloy which provides the structural element to support the active material (lead) of the electrode. When charged, the electrodes become positively or negatively charged, where the energy is stored, until used in whatever application the battery is put. The battery may also be recharged from time to time.

Lead has been predominately used in such batteries for a long period of time. While lead is not particularly a good conductor of electricity, it is inherently corrosive resistant to the electrolytic acids. Other, more conductive metals are either too expensive to be used as the electrode for lead-acid batteries, or else they are quickly corroded during the charging action by the electrolytic acids. Therefore lead has remained as the predominant material. Lead is also very heavy, and in applications where weight is a factor, other alternatives have long been sought.

For example, in the aircraft industry, experts have calculated that the fuel cost of flying a commercial airliner is more than $3,000 per year per pound of weight flown. Therefore, if the airplane carries batteries having lead plates, considerable sums of money could be saved per plane if a lighter weight plate material could be found.

In previous attempts, one approach has been to plate lead onto other more conductive metals or metal alloys such as aluminum and copper. Copper is sixteen times as conductive as lead and weighs only about 70% as much. Aluminum, on the other hand has a specific gravity of only 20%–25% of lead and approximately eight times the conductivity of lead. Obviously, from the standpoint of weight and conductivity, copper and aluminum are good candidates to replace lead as the substrate for electrodes. However both materials are very susceptible to corrosion in the presence of sulfuric acid, and cannot be used as the positive electrode in a lead acid battery if left unprotected. Either material can be used as the negative electrode, and copper has in the past. In previous attempts to use aluminum or copper as the structural element for the plates of a lead acid battery in the past, attempts have been made to plate lead coatings onto aluminum or copper substrates. The conventional manner for plating lead is from an aqueous solution. The problem arises that when lead is plated from an aqueous solution, for one reason or another, the coatings are porous, and the sulfuric acid will quickly penetrate the coatings and attack the aluminum or copper. In such instances, the copper and aluminum plates have not survived the charging operation.

Some early research suggests that providing a lead coating over aluminum from a fused salt bath could provide a protective coating for aluminum plates and might be used as the electrodes of a lead-acid battery.

SUMMARY OF THE INVENTION

The present invention is directed toward reducing the weight per unit mass of the battery by replacing the lead or lead alloy plates of the battery with a lighter weight, conductive material that is plated by lead or some other conductive coating that is resistant to the electrolytic acid. Toward this end, then, the present invention utilizes a highly conductive non-lead substrate as the structural material for lead-acid battery plates. This substrate is significantly lighter than lead having a specific gravity of no greater than 70% that of lead. The substrate is then coated with a continuous layer of a conductive material that is corrosive resistant to the electrolytic acid to be used in the battery. This protective layer is plated on to the substrate from a fused salt bath. The result is a continuous coating that is substantially non-porous and protects the lighter weight conductive substrate. As a result, the energy to weight ratio, when compared to conventional lead plate cells, is in the range of 35–50 Watt-hours/kologram (WH/kg). That is to say, rather than an energy to weight ratio of approximately 30 WH/kg as in the case of conventional lead plate lead-acid batteries, the energy to weight ratio of batteries of the present invention may be in the range of about 35–50 WH/kg.

The non-lead substrates may be aluminum, aluminum alloys, aluminum/magnesium alloys, copper, copper alloys, nickel, nickel alloys or non-metallic materials such as graphite, carbon fibers and conductive plastics.

The corrosive resistant protective layer is formed from such materials as lead, lead alloys, lead/tin alloys and conductive epoxies. The fused salt bath may be selected from the group consisting of lead chloride alone; lead chloride, lithium chloride and potassium chloride; lead chloride and a lead/tin alloy; lead chloride, potassium chloride, and sodium chloride; lead chloride and lead nitrate; lead chloride and potassium nitrate; and lead chloride and sodium nitrate.

In an even more preferred embodiment, a thin intermediate layer (0.0001–0.0050 inches) of nickel, gold or titanium may be applied to the substrate, as a striking layer. This striking layer improves the bonding of the lead to the substrate as lead does not generally bond well directly to aluminum.

DESCRIPTION OF THE PREFERRED EMBODIMENTS

Figure 1:
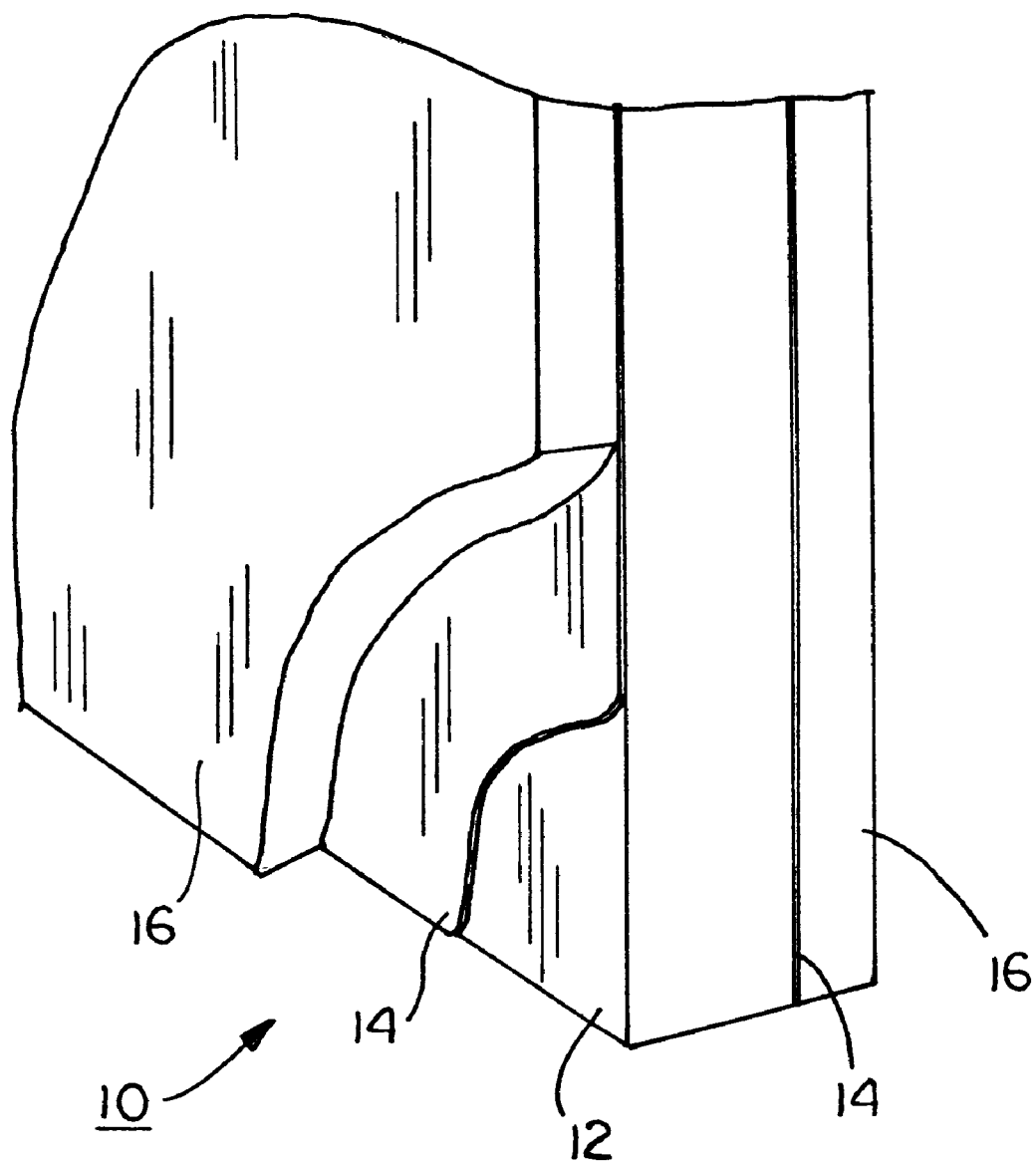
FIG. 1 is a perspective view, with parts broken away of a portion of a battery grid according to the present invention.

Referring now to FIG. 1, there is illustrated a plate (particularly a negative plate) 10 for a lead-acid battery cell. The plate is constructed in such a manner as to be at least 30% lighter than conventional lead plates. Toward this end, there is provided a substrate or grid 12 formed of a material such as aluminum, aluminum alloys, aluminum/magnesium alloys, copper, copper alloys, nickel, nickel alloys, or even non-metallic materials such as carbon fibers or graphite.

Preferably, but not necessarily, there is provided an underlying or striking layer of a corrosive resistant conductive material such as gold, titanium, nickel, tin, silver or lead metaplumbate. This striking layer 14 may be added by plating, vapor deposition, or some other method and bonds well to the grid and to the lead outer layer.

The outer layer 16 is a thin layer of lead, or a lead/tin alloy.

The conductive substrate has a thickness in the range of 0.001 to 0.050 inches. The striking layer 14 should have a thickness in the range of 0.00001–0.0005 inches. Finally, the lead outer or protective coating should have a thickness in the range of 0.001 to 0.005 inches.

The resulting plate realizes an energy to weight ratio in the range of about 35 to about 50, compared with conventional lead plates which realize an energy to weight ratio of about 30. For purposes of comparison, the specific gravities and resistivities of the relevant materials are as follows:

|    | MATERIAL  | SPECIFIC GRAVITIES | RESISTIVITY IN (U-OHMS) |
|----|-----------|--------------------|-------------------------|
| a. | lead      | 11.35              | 22                      |
| b. | aluminum  | 2.7                | 2.82                    |
| c. | copper    | 8.9                | 1.72                    |
| d. | magnesium | 1.74               | 0.80                    |

Figure 2:
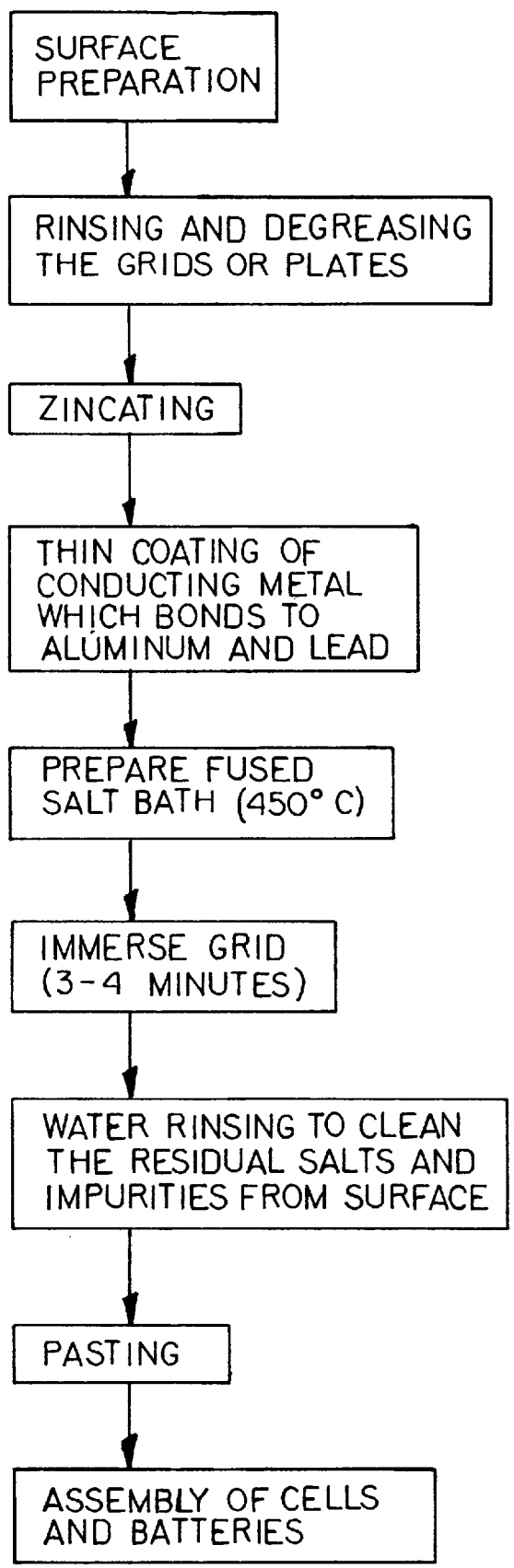
FIG. 2 is a flow chart illustrating a method of forming the electrode of FIG. 1.

Turning now to FIG. 2, there is illustrated in general, a method for forming the lead coated non-lead substrates to form the plates of the present invention. First, the lightweight substrate, such as aluminum, magnesium, nickel, tin, silver or copper is formed into grids. The surface of the grids is prepared by initially sand or bead blasting, or chemical cleaning followed by the step of rinsing and degreasing using water or solvents. The cleaned surface is then preferably zincated to protect against oxidation.

Preferably, there is applied a thin coating (o.000001 to 0.0005 inches) of a conducting metal, such as copper, nickel, titanium, zinc or gold or any other metal coating which bonds to both lead and aluminum. This layer is preferable, but not absolutely necessary.

The next step is the plating of the lead onto the substrate. In order to accomplish this, first a fused salt bath is formed by melting a source of lead in the salt or salts. The bath is formed by heating the metal salt, halides or nitrates to a temperature of at least 425° C. The temperature is not critical, however it must be high enough to melt and maintain the bath in a molten condition.

The grid or grids are then immersed in the molten bath for a period of 3–4 minutes. The thin layer of lead (1–5 mils) gets deposited on the grid depending time of immersion and temperature of bath. Once the plated grids are removed from the bath, the grids are rinsed to clean the residual salts and impurities from the surface.

The grids are then pasted with positive and negative active materials and assembled into cells and batteries.

The following examples set forth various compositions of fused salt baths which may be used for the plating operation:

EXAMPLE 1

Lead Halide Solution—Lead Chloride ($PbCl_2$) is heated at 450° C. until the compound melts completely. The lead chloride should be free from other impurities. A small amount of silver (0.1%) may be provided in the melt to improve the adhesion of the lead to the aluminum. The grid(s) is immersed in the melt solution which is maintained at 450° C. for 3–4 minutes or until the desired thickness of lead is achieved. The temperature of the melt can be increased or decreased to achieve the thickness of the lead desired. The best range of temperatures appears to be 425° C.–500° C., however higher temperature can also be used.

EXAMPLE 2

In this example, lead chloride is combined with lithium chloride and potassium chloride. The portions are as follows:

a. lead chloride—81% b. lithium chloride—9% c. potassium chloride 10%

The mixture is heated to approximately 460° C. Again the grid(s) is immersed for several minutes based on the desired thickness of lead required. However the temperature can be increased to 490° C. again depending on the desired lead thickness.

EXAMPLE 3

In this example lead chloride is combined with a lead/tin alloy to form the molten salt bath. The lead chloride comprises approximately 91% of the mixture while the lead/tin alloy make up the other 9% with the lead being approximately 6% and the tin being approximately 3%. This mixture is also heated to a temperature in the range of 425° C. to about 500° C.

EXAMPLE 4

Lead chloride is melted with a salt flux of lithium chloride and potassium chloride. The lead chloride forms approximately 90% of the mixture, and the lithium chloride and potassium chloride make up the remaining 10% in approximately equal portions.

EXAMPLE 5

This example is similar to example 4, except the salt flux is formed of approximately 5.3% potassium chloride and 4.7% sodium chloride, along with the 90% lead chloride.

It is believed that other salt fluxes including lead nitrate, potassium nitrate, and sodium nitrate can also be used with the lead chloride in forming the acid bath solution.

Certain modifications and improvements will occur to those skilled in the art upon a reading of the foregoing description. By way of example, any other salts of lead, which is ionic in nature, and used for plating or coating of lead in any industry could be used in the above examples. It should be understood that all such modification and improvements, while not discussed in detail hereinabove, are properly within the scope of the following claims.

We claim:

1. Lightweight, low resistance electrode plates for lead-acid batteries comprising:

a) a highly conductive non-lead substrate having a specific gravity no greater than 70% that of lead;

b) a continuous outer layer of a conductive material that is corrosive resistant to the electrolyte acids of the battery;

c) a striking layer between the substrate and the outer layer of conductive material selected from the group consisting of copper, nickel, titanium, zinc, tin and gold which serves to bond the lead to the substrate.

d) the outer continuous layer having a thickness in the range of 0.0001 to 0.0005 inches and being applied from a fused salt bath.

2. The electrode plate according to claim 1 wherein said substrates are selected from the group of materials consisting of aluminum, magnesium, copper, and alloys thereof.

3. A lead-acid battery of the type having a plurality of alternating electrodes housed in a compartment containing electrolyte, wherein at least the current collecting electrodes comprise:
   a) a highly conductive non-lead substrate selected from the group consisting of aluminum, aluminum alloys, aluminum/magnesium alloy, copper, copper alloys, graphite, carbon fibers, and conductive plastics;
   b) a striking layer of conductive material selected from the group consisting of copper, nickel, titanium, zinc, silver, tin and gold which serves to bond the lead to the substrate;
   c) an outer continuous layer of a corrosive resistant conductive material to electrolytic acids selected from the group consisting of lead, lead alloys, lead/tin alloys.
   d) said continuous layer being applied from a fused salt bath formed of the molten salts selected from the group consisting of 50% sodium chloride/50% potassium chloride; 50% lead chloride/50% lead nitrate; and 50% potassium nitrate/50% sodium nitrate.

4. The lead-acid battery according to claim 3 wherein said substrates are selected from the group of materials consisting of aluminum, magnesium, copper, and alloys thereof.

5. A method for claiming lightweight, low resistance electrode plates for lead-acid batteries comprising the steps of:
   a) cleaning and preparing substrates formed of a conductive, non-lead material having a specific gravity no greater than 70% that of lead;
   b) applying a striking layer of conductive material selected from the group consisting of copper, nickel, titanium, zinc, silver, tin and gold which serves to bond the lead to the substrate;
   c) preparing a molten salt solution of at least a lead salt;
   d) immersing the conductive, non-lead substrate into the molten lead salt for a period of time to coat the substrate with a lead coating of a desired thickness.

6. The method according to claim 5 wherein said substrates are selected from the group of materials consisting of aluminum, magnesium, copper, and alloys thereof.

7. The method according to claim 5 wherein the molten salt bath is formed of lead chloride.

8. The method according to claim 5 wherein the molten salt bath is formed of lead chloride, lithium chloride, and potassium chloride with the lead chloride forming at least 80% of the bath.

9. The method according to claim 5 wherein the bath is formed of lead chloride, and a lead/tin alloy.

10. The method according to claim 5 wherein the molten salt bath includes lead chloride along with potassium chloride and sodium chloride, with the lead chloride comprising about 90% of the bath.

11. The method according to claim 5 wherein the molten salt bath is selected from the group consisting of potassium nitrate, sodium nitrate, lead nitrate, and combinations thereof.

* * * * *

UNITED STATES PATENT AND TRADEMARK OFFICE
CERTIFICATE OF CORRECTION

PATENT NO. : 6,447,954 B1
DATED : September 10, 2002
INVENTOR(S) : John B. Timmons et al.

It is certified that error appears in the above-identified patent and that said Letters Patent is hereby corrected as shown below:

<u>Column 4,</u>
Lines 65 and 66, section d), please delete "0.0001 to 0.0005" after the words: "in the range of", and please insert -- 0.001 to 0.005 -- after the words: "in the range of".

Signed and Sealed this

Seventh Day of January, 2003

JAMES E. ROGAN
*Director of the United States Patent and Trademark Office*